(12) United States Patent
Burlatsky et al.

(10) Patent No.: US 10,888,924 B2
(45) Date of Patent: Jan. 12, 2021

(54) CONTROL FOR POWDER FUSION

(71) Applicant: United Technologies Corporation, Farmington, CT (US)

(72) Inventors: Sergei F. Burlatsky, West Hartford, CT (US); David Ulrich Furrer, Marlborough, CT (US); Rebecca L. Runkle, Manchester, CT (US); Jesse R. Boyer, Middletown, CT (US); Christopher F. O'Neill, Marlborough, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 290 days.

(21) Appl. No.: 15/880,931

(22) Filed: Jan. 26, 2018

(65) Prior Publication Data
US 2018/0229303 A1 Aug. 16, 2018

Related U.S. Application Data

(60) Provisional application No. 62/451,330, filed on Jan. 27, 2017.

(51) Int. Cl.
*B22F 3/105* (2006.01)
*B33Y 10/00* (2015.01)
(Continued)

(52) U.S. Cl.
CPC .......... *B22F 3/1055* (2013.01); *B29C 64/393* (2017.08); *B33Y 10/00* (2014.12);
(Continued)

(58) Field of Classification Search
CPC ....... B22F 3/1055; B33Y 10/00; B33Y 30/00; B33Y 50/00
See application file for complete search history.

(56) References Cited

U.S. PATENT DOCUMENTS

2014/0332507 A1  11/2014  Fockele
2016/0059493 A1   3/2016  Sparks et al.
2016/0184893 A1*  6/2016  Dave ............... B29C 64/153
                                        419/53

FOREIGN PATENT DOCUMENTS

EP      3232353       10/2017
WO      WO-2015120047 A1 *  8/2015  ........... B23K 26/354

OTHER PUBLICATIONS

Extended European Search Report for European Patent Application No. 18153971.9 completed Jun. 7, 2018.
(Continued)

*Primary Examiner* — Jacob T Minskey
*Assistant Examiner* — Melody Tsui
(74) *Attorney, Agent, or Firm* — Carlson, Gaskey & Olds, P.C.

(57) ABSTRACT

A powder processing machine includes a work bed, a powder deposition device operable to deposit powder in the work bed, at least one energy beam device operable to emit an energy beam with a variable beam power and direct the energy beam onto the work bed with a variable beam scan rate to melt and fuse regions of the powder, and a controller operable to dynamically control at least one of the beam power or the beam scan rate to change how the powder melts and fuses. The controller is configured to determine whether an instant set of process parameters falls within a defect condition or a non-defect condition and adjust at least one of the beam power or the beam scan rate responsive to the defect condition such that the instant set of process parameters falls within the non-defect condition.

20 Claims, 14 Drawing Sheets

(51) Int. Cl.
*B33Y 30/00* (2015.01)
*B33Y 50/02* (2015.01)
*G05B 19/4099* (2006.01)
*B29C 64/393* (2017.01)
*G06F 30/20* (2020.01)
*B29C 64/153* (2017.01)
*G06F 119/08* (2020.01)

(52) U.S. Cl.
CPC ............... *B33Y 30/00* (2014.12); *B33Y 50/02* (2014.12); *G05B 19/4099* (2013.01); *G06F 30/20* (2020.01); *B22F 2003/1056* (2013.01); *B22F 2003/1057* (2013.01); *B22F 2203/11* (2013.01); *B22F 2999/00* (2013.01); *B29C 64/153* (2017.08); *G05B 2219/36252* (2013.01); *G06F 2119/08* (2020.01); *Y02P 10/25* (2015.11)

(56) References Cited

OTHER PUBLICATIONS

Mindt, H.W., Desmaison, O., Megahed, M., Peralta, A., and Neumann, J. (2016). Modeling of powder bed manufacturing defects. Journal of Materials Engineering and Performance. ASM International. Sep. 5, 2015. vol. 27(1). pp. 32-43.

Mindt, H.W., Megahed, M., Shula, B., Peralta, A.D., and Neumann, J. (2016). Powder bed models-Numerical assessment of as-built quality/ Structures, Structural Dynamics, and Materials Conference. Jan. 4, 2016. pp. 3352-3358.

Sames, W.J., List, F.A., Pannala, S., Dehoff, R.R. And Sabu, S.S. (2016). The metallurgy and processing science of metal additive manufacturing. International Materials Reviews. vol. 91(5). Mar. 7, 2016. pp. 315-360.

Markl, M. and Korner, C. (2016). Multiscale modeling of powder bed-based additive manufacturing. Annual Review of Materials Research. vol. 46(1). Jul. 1, 2016. pp. 93-123.

\* cited by examiner

CONTROL FOR POWDER FUSION

CROSS-REFERENCE TO RELATED APPLICATION

This disclosure claims benefit of U.S. Provisional Application No. 62/451,346 filed Jan. 27, 2017.

BACKGROUND

Powder bed fusion processes for additive manufacturing, such as Direct Metal Laser Sintering (DMLS), can provide advanced components in a single manufacturing process. The process typically involves iteratively depositing powder layers and melting/fusing select regions of the layers using an energy beam to build up a component layer-by-layer.

Control schemes for such processes have limitations. A typical control scheme permits a user limited control over process parameters, such as power, speed, and path of the energy beam (e.g., a laser or electron beam). The user controls the process via preset "themes" from which the user can select a theme for a given geometry of a component. For instance, a geometry that overhangs the powder bed (a "downskin") may have a corresponding theme with its own presets for a single power, single speed, and path parameters for stripe width and overlap. Outside of selecting that theme versus another theme that has different presets, there is no ability to vary these parameters once the theme begins.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

In a powder bed fusion process, aside from selecting one theme versus another theme, there is no ability to vary process parameters once the theme begins. Moreover, if parameters such as power, speed, and path are to be adjusted during the process, there is still the matter of how to vary such parameters to enhance melting and fusion and thus improve the quality of the components built. In this regard, the present disclosure sets forth a model-based approach for implementation of a dynamic control scheme that is capable of adjusting parameters during the process to facilitate the production of high quality parts with fewer defects, such as key-holing, balling, and unmelt porosity defects commonly found in powder bed manufacturing.

The approach involves, inter alia, modeling of the melt pool, prediction of aspects such as the shape of the melt pool, energy density, and porosity. For instance, one output of the model may be a dynamic process map of energy beam power versus speed, although other modeling input parameters could be assessed by such process maps. Through the modelling, all input parameters may be included in the analysis and in the 2-parameter process maps. The models are used to establish regions in the process map where defect conditions are predicted to exist. Thus, a control scheme can plot an instant point in the build on the process map, and adjust the power or speed to be outside of the region of the defect conditions, thereby facilitating the production of a higher quality, lower defect component.

Figure 1:
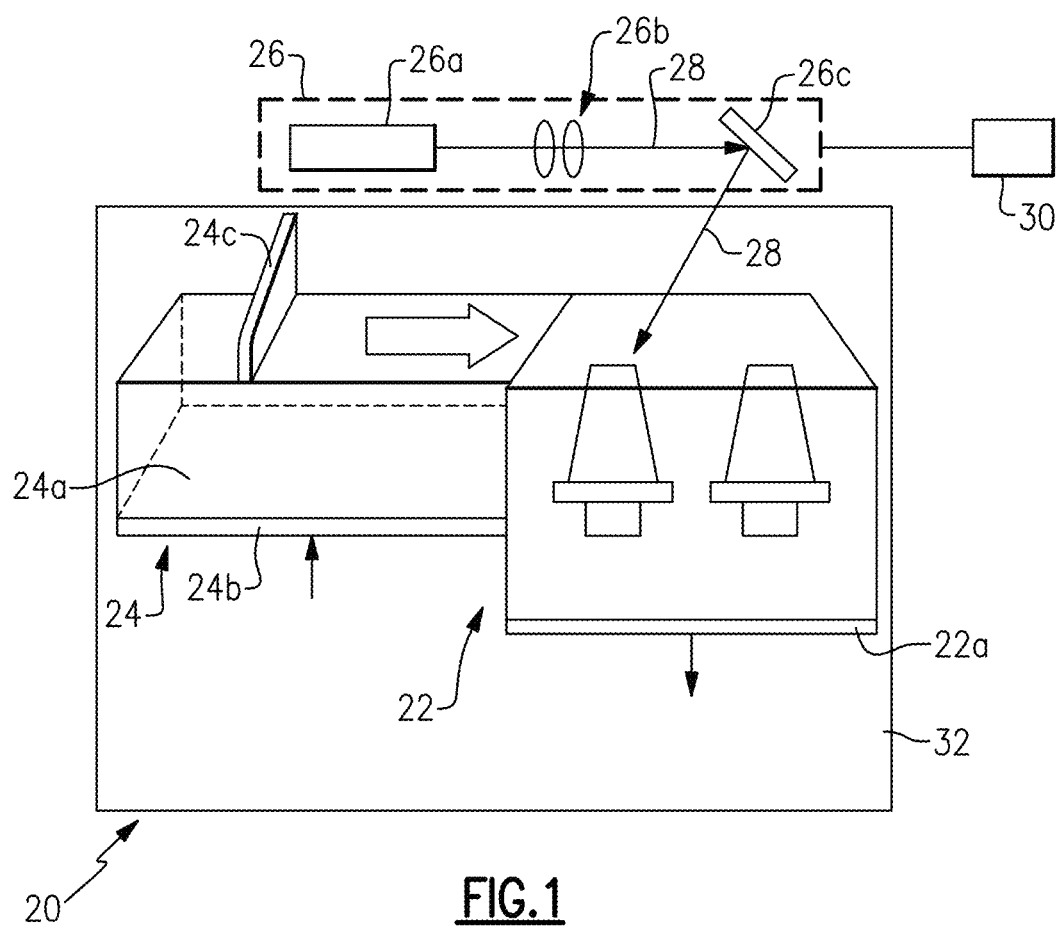
FIG. 1 illustrates an example powder processing machine.

FIG. 1 illustrates a powder processing machine 20. The machine 20 may be used in an additive manufacturing process (e.g., powder bed fusion) to fabricate components (e.g., depicted as "build parts"). Although not limited, the components may be gas turbine engine components, such as airfoils, seals, tubes, brackets, fuel nozzles, heat shields, liners, or panels. Additionally, the components may be fabricated from a wide range of materials, including but not limited to, metal alloys.

The machine 20 generally includes a work bed 22, a powder deposition device 24 that is operable to deposit powder (e.g., a metal powder) in the work bed 22, an energy beam device 26 that is operable to emit an energy beam 28 with a variable beam power and direct the energy beam onto the work bed 22 with a variable beam scan rate to melt and fuse regions of the powder, and a controller 30 that is in communication with at least the energy beam device 26. All but the controller 30 may be enclosed in an environmental chamber 32. As will be appreciated, although not shown, the machine 20 may include additional components, such as but not limited to, a vacuum pump, process gas sources, and related valves.

In this example, the work bed 22 includes a build plate 22a upon which the powder is deposited and the component is built. The build plate may be actuated using a piston or the like to lower the build plate 22a during the process. The powder deposition device 24 may include a powder supply bed 24a supported on a bed plate 24b, and a recoater arm 24b. The bed plate 24b may be actuated using a piston or the like to raise the bed plate 24b during the process. The recoater arm 24b is operable to move across the supply bed 24a and work bed 22, to deposit layers of powder in the work bed 22. The operation of the work bed 22 and powder deposition device 24 may be controlled via the controller 30.

In this example, the energy beam device 26 includes a laser 26a, one or more lenses 26b, and a mirror 26c. The mirror 26c may be actuated (at the command of the controller 30) to control the direction of the energy beam 28 onto the work bed 22. The laser 26a and one or more lenses 26b may be modulated (at the command of the controller 30) to control the power of the energy beam 28. For example, the energy beam 28 can be operated with varied energy levels from no power (off) to the highest power setting as required to maintain processing parameters within a safe zone to mitigate defect formation. Although shown with the laser 26a, it will be appreciated that the energy beam device 26 may alternatively utilize an electron beam gun, multiple electron beam guns, or multiple lasers, and the laser or lasers may be continuous or intermittent (pulsing).

The controller 30 may include hardware (e.g., one or more microprocessors, memory, etc.), software, or combinations thereof that are programmed to perform any or all of the functions described herein. The controller 30 is operable to dynamically control at least one of the beam power (Watts) or the beam scan rate (meters per second) to change how the powder melts and fuses in the work bed 22. The control of power and scan rate may also extend to "resting time" of the energy beam device 26, at which power is equal to zero and scan rate is equal to zero. For instance, the "resting time" parameter may be used when the powder bed is being re-coated, and time can be added to start the process (which may also depend on the number of parts being built in the work bed 22 because the energy beam 28 "jumps" from one part to another). The term "dynamically control" refers to the ability of the controller 30 to change at least one of the power or the scan rate as the energy beam 28 scans across the powder to melt and fuse the powder during an additive manufacturing process. In this regard, the controller 30 is configured to determine whether an instant set of process parameters (variables) falls within a defect condition or a non-defect condition and adjust at least one of the beam power or the beam scan rate responsive to the defect condition such that the instant set of process parameters falls within the non-defect condition. For instance, the list below contains an example set of process parameter variables, which will be used in the subsequently described development of the models upon which the dynamic control is based. In some instances, example values are listed for the variables, but it is to be understood that the values are variable based on the composition of the metal, energy beam, bed design, etc.

P is laser power in Watts (e.g., 285 W)
P' is power injected into melt pool
V is laser beam velocity
α is laser beam absorption coefficient (e.g., 0.38)
$\Delta H_{fus}$ is heat of melting
C is metal heat capacity
ρ is metal density
$D_T$ is thermal diffusivity in meters squared per second (e.g., $5*10^{-6}$ m$^2$/s)
λ is metal powder heat conductivity in Watts Kelvin per meter (e.g., 20 W/m/K)
$T_m$ is melting temperature of metal in Kelvin (e.g., 1600 K)
$T_b$ is boiling temperature of metal
$T_0$ is ambient temperature or instant temperature at laser beam location in Kelvin
$T_{BP}$ is temperature of the build plate surface of the work bed
$d_{pp}$ is powder particle diameter in meters
h is powder bed thickness in meters ε is powder bed local density in grams per cubic centimeter, or alternatively as a fraction of the density of closely packed spheres (dimensionless)
x, y, and h are reference coordinates representing an instant location in the work bed 22 in the x-direction, y-direction, and height above the build plate 22a, respectively In addition to or in place of powder bed local density, powder layer thickness and compaction degree may be used. For example, piston drop may be used (e.g., piston drop may be 40 micrometers, while the actual layer thickness becomes 80 micrometers after the initial layers because of material shrinkage; the piston drops 40 micrometers after the first layer, but spreads 60 micrometers because the first layer shrunk by 50%).

Figure 2A:
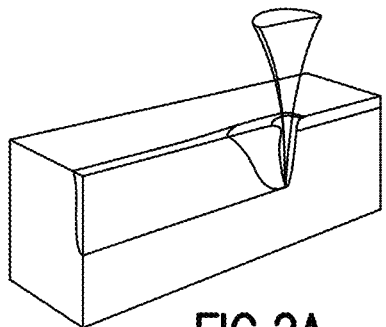
FIGS. 2A, 2B, and 2C illustrates powder processing defects.
Figure 2B:
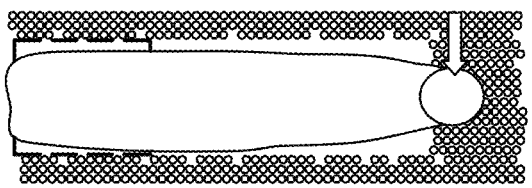
Figure 2B:
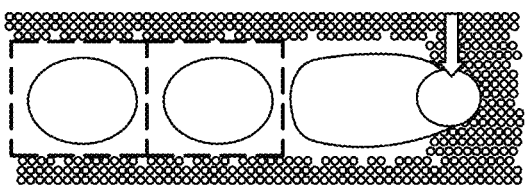
Figure 2C:
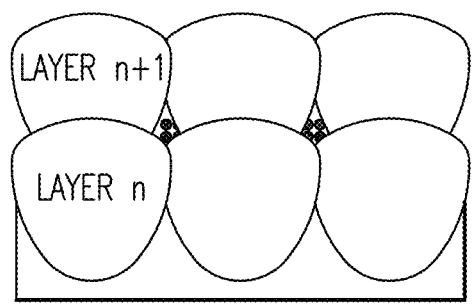

The defect condition(s) correspond to one or more specific types of defects often found in additive manufacturing, such as (unstsable) key-holing, balling, and unmelt porosity. Key-holing, balling, and unmelt porosity defects are depicted, respectively, in FIGS. 2A, 2B, and 2C. In general, key-holing results from excessive evaporation of the melt due to high energy beam power, slow energy beam scan rate, or both; balling results from unstable elongated melt pools that break into discrete balls or islands; and unmelt porosity results from pockets of unmelted powder due to low energy beam power, fast scan rate, or both.

Each of these types of defects was modeled, as discussed further below, based on the process parameter variables. The modeling, in turn, enabled each type of defect to be mapped on a plot of energy beam power versus scan rate. Thus, for a given set of process parameter variables, there may be one or more regions on the plot where defect conditions are predicted to occur. In turn, if the power and scan rate at an instant location in the work bed 22 during a process lies within a region of a defect condition, the power, scan rate, or both, can be dynamically adjusted during the process such that the plot of the adjusted power and scan rate fall outside of the region of the defect condition (in a region where non-defect conditions exist). In this manner, as the energy beam 28 scans a path across the powder to melt and fuse the powder, the controller 30 may dynamically adjust power, scan rate, or both location-by-location along the path (e.g., voxel-by-voxel) to ensure that at each location the power and scan rate correspond to a plot location on the map with a non-defect condition.

The methodology herein may also provide a technique for rapid component qualification, wherein the output of additive manufacturing machine sensors compared with target parameters will help assess quality level and conformance of the built components. Further, the methodology herein may be used to simulate a build path for entire components and then use the simulated path to build the actual component. The control system could, for example, be of two types: i) follow explicitly the parameter sets pre-defined for all specific locations, but monitor the parameter separately as well to enable comparison and validation that the process was run to plan or ii) run the controller from the start with a pre-defined path, but the parameters for time, speed and power are determined in-process based on sensor readings and the established models. In addition to power and scan rate, the path of the energy beam could also be adjusted either before building via the modelling (e.g., to a less complex scan path with power and speed being the driving factors), or the path could be adjusted during a build (e.g., if the melt pool width varied outside its bounds, the scan spacing may be adjusted).

The following examples illustrate the mathematical modeling of defects for use in a dynamic control scheme.

Example 1: Modeling of Melt Pool

Figure 3:
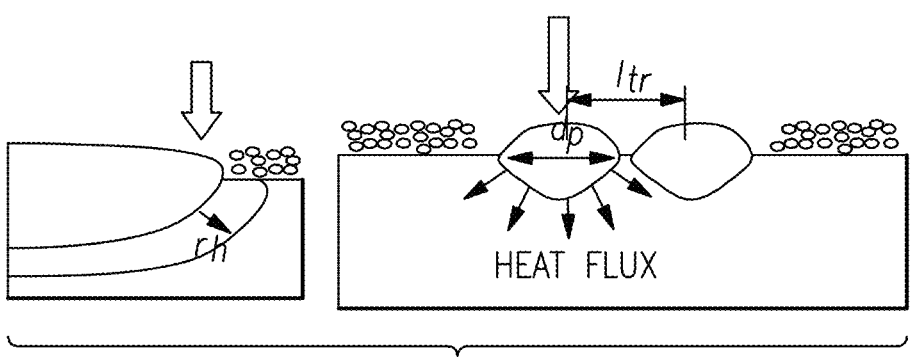
FIG. 3 depicts a model for melt pool.

Referring to FIG. 3, a model of the cross-sectional area of the melt pool generated during melting of the powder was developed. The cross-sectional area is calculated from an energy balance.

$\Delta H_{fus} = 1.47 \cdot 10^9$ J/m$^3$  Enthalpy of melting $\Delta H_{heat} = \rho C(T_m - T_0) = 4.6 \cdot 10^9$ J/m$^3$  Enthalpy of heating $\Delta H_{fus} << \Delta H_{heat}$ Energy density $E = \dfrac{P'}{V} = 1.1 \cdot 10^2$ J/m $\Delta H = \Delta H_{fus} + \Delta H_{heat} = 6.1 \cdot 10^9$ J/m$^3$  Enthalpy of heating+melting Energy loss due to metal heating adjacent to the pool Power injected into melt pool $P' = \xi \alpha P$ $\xi = \left[\sqrt{1 + \dfrac{A^2}{4}} - \dfrac{A}{2}\right]^2$ $A = \dfrac{\lambda}{\alpha P}(T_m - T_0)\sqrt{2\pi \dfrac{\alpha P}{V \Delta H}}$ Melt pool cross-section $S_p = \dfrac{\xi E}{\Delta H} = \dfrac{\alpha \xi P}{V \Delta H}$

Example 2: Model of Balling

Figure 4:
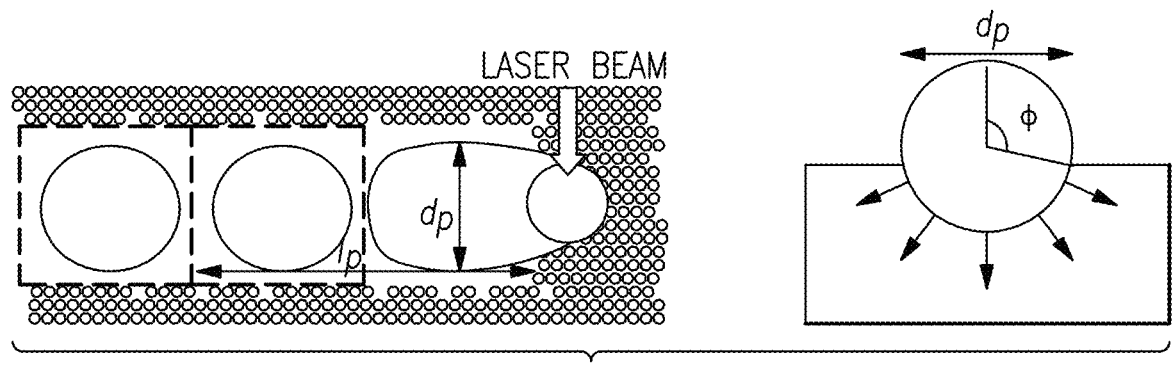
FIG. 4 depicts a model for balling.

Referring to FIG. 4, balling is calculated from a modified Rayleigh condition of instability for the melt pool aspect ratio.

Modified Rayleigh condition $\dfrac{l_p}{d_p} > \pi f(\Phi)$ $f(\Phi)$ is a function of angle $\Phi$ (takes into account pool stabilization by substrate)

$f(\Phi) = \sqrt{\dfrac{2\Phi(2 + \cos(2\Phi)) - 3\sin(2\Phi)}{2\Phi(1 + \cos(2\Phi)) - 2\sin(2\Phi)}}$ Melt pool diameter $d_p = \sqrt{\dfrac{4 S_p}{\pi}} = \sqrt{\dfrac{4}{\pi} \dfrac{P'}{V \Delta H}}$ Solidification time $t = \dfrac{l_p}{V}$ Heat flux from pool $Q = \dfrac{\pi l_p \lambda (T_m - T_0)}{\ln(2 l_p / d_p)}$ Energy balance $Q t = S_p l_p \Delta H_{fus}$ $\rightarrow \; l_p = \dfrac{P'}{\pi \lambda (T_m - T_0)} \dfrac{\Delta H_{fus}}{\Delta H} \ln\left(\dfrac{l_p}{r_p}\right)$ $\ln\left(\dfrac{2 l_p}{r_p}\right) \sim 2$ Balling condition $\dfrac{\Delta H_{fus}}{\lambda \pi f(\Phi)(T_m - T_0)} \sqrt{\dfrac{P' V}{\pi \Delta H}} > 1$ $f(\Phi)$ is a function of angle $\Phi$ (takes into account pool stabilization by substrate)

Figure 5:
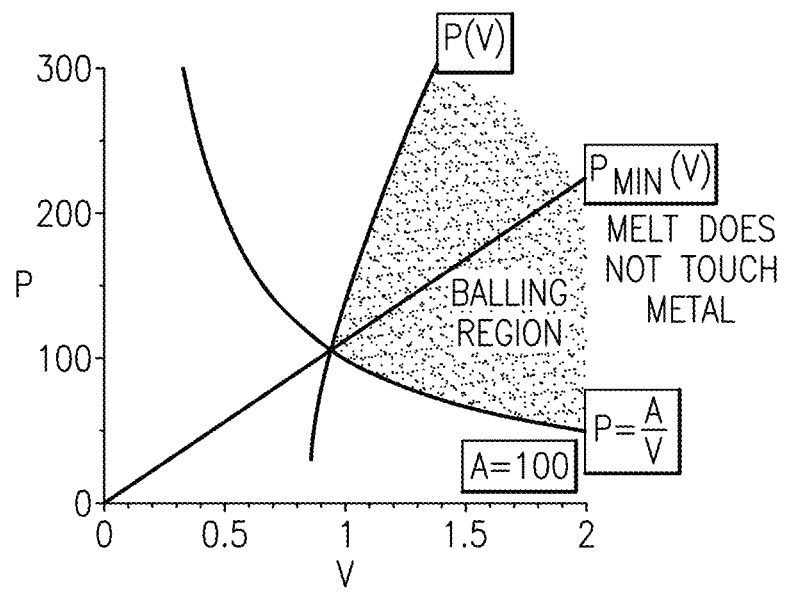
FIG. 5 illustrates an example process map for balling.

Final balling condition $P(V) = BV\left(1 + 2\dfrac{d_{pp}}{w} + \sqrt{1 + 4\dfrac{d_{pp}}{w} - \dfrac{2A}{BV^2}}\right) - \dfrac{A}{V}$ $P = \dfrac{P'}{\xi \alpha}$ $A = \pi^3 \Delta H \left(\dfrac{\lambda(T_m - T_0)}{\Delta H_{fus}}\right)^2$ $w = \dfrac{4(1 - \varepsilon)}{\pi} h$ $B = \dfrac{\pi w^2 \Delta H}{2}$ $\Delta H = \Delta H_{fus} + C(T_m - T_0)$ $P_{min} = V \cdot \dfrac{1}{4} B \left(1 + 4\dfrac{d_{pp}}{w} + \sqrt{1 + 8\dfrac{d_{pp}}{w}}\right)$ FIG. 5 illustrates an example of a map of the balling condition region (shaded) on a plot of power versus scan rate.

Example 3: Model of Unmelt Porosity

Figure 6A:
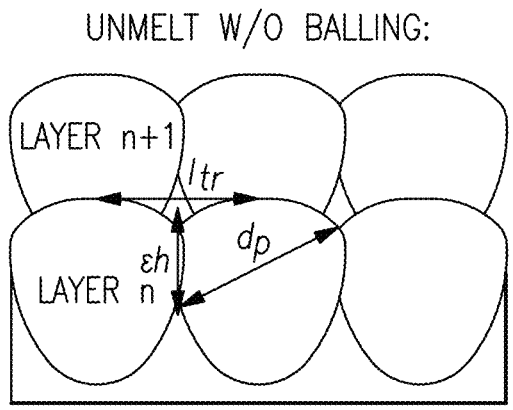
FIGS. 6A, 6B, and 6C depict models for unmelt porosity.
Figure 6B:
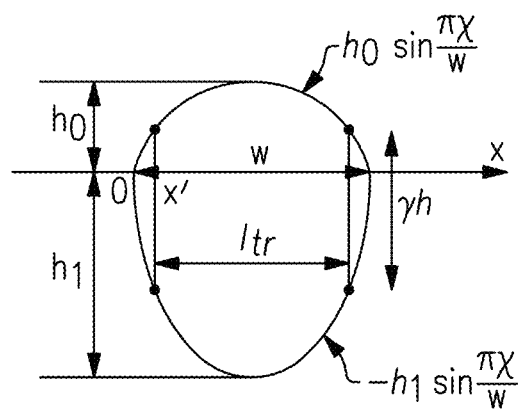
Figure 6C:
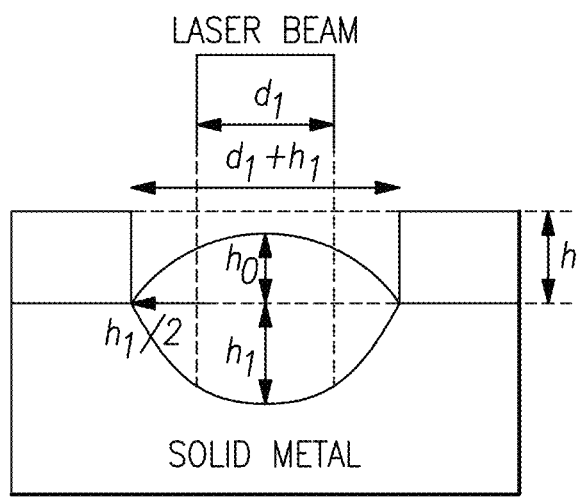

FIG. 6A depicts unmelt porosity without balling, and FIGS. 6B and 6C illustrate the assumed melt pool geometry. The model of unmelt porosity is based on a regular array of pores predicted at deterministic unmelt conditions.

Melt pool cross-section $\dfrac{P'}{V \Delta H} = \dfrac{2}{\pi} w(h_0 + h_1)$

Figure 7A:
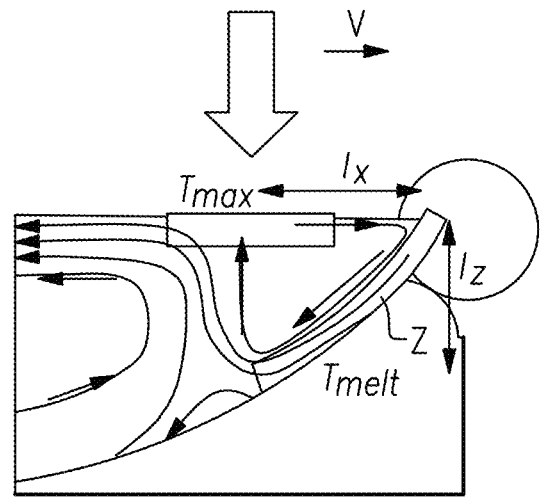
FIGS. 7A, 7B, 7C, and 7D depict models for keyholing.
Figure 7B:
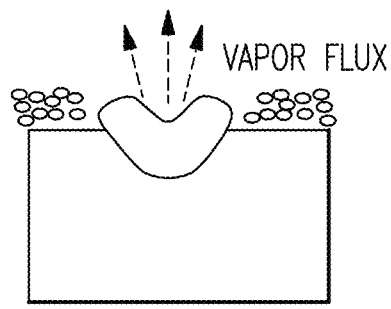

Unmelt criterion $(h_0 + h_1)\sin\dfrac{\pi x'}{w} = \gamma h$ $w = l_{tr} + 2x'$ Approximate equation for $w$: $\left(w + \dfrac{\pi}{2}\gamma h - d_l\right)\left(1 - \dfrac{l_{tr}^2}{w^2}\right) \approx \gamma h$ Additional assumption: $w = d_l + h_1$ Unmelt criterion:

Without balling $\left(\dfrac{P'}{V \Delta H}\right) < \dfrac{2}{\pi} w\left(w + \dfrac{\pi}{2}\gamma h - d_l\right)$ $P = \dfrac{P'}{\xi \alpha}$ With balling $\left(\dfrac{P'}{V \Delta H}\right) < \dfrac{2}{\pi} w\left(w + \dfrac{\pi}{2}(\gamma + 1)\gamma h - d_l\right)$ Example 4: Model of Key-Holing Porosity Referring to FIGS. 7A, 7B, and 7C, the model of key-hole porosity is based on a force and heat balance in a Marangoni vortex to determine flow velocity and maximal temperature under the energy beam.

Marangoni surface stress: $\sigma_M = \frac{\partial \sigma}{\partial T} \nabla T \approx \frac{\partial \sigma}{\partial T} \frac{T_{max} - T_m}{l_x}$ Marangoni stress is equal to shear stress caused by viscosity $\frac{\partial \sigma}{\partial T} \frac{T_{max} - T_m}{l_x} = \eta \frac{V_f}{l_\eta}$ $l_\eta$ is laminar sublayer thickness Mass balance for green zone ("Z" in FIG. 7) $l_\eta V_f = l_z V$ Energy balance for vortex $\alpha P = 2\lambda \frac{T_{max} - T_m}{l_T} \frac{\pi}{4} d_l^2$ Heat penetration depth into vortex $l_T = \sqrt{\frac{D_T d_l}{V_f}}$ thermal diffusivity $D_T = \frac{\lambda}{\rho C}$ Keyhole/porosity formation criterion: $V_f = \sqrt{\frac{\partial \sigma}{\partial T} \frac{T_{max} - T_m}{\eta} V}$ Typical value $V_f \sim 15$ m/s Keyhole forms when recoil vapor pressure ~ capillary pressure of the pool $P_{cap} = \frac{\sigma}{d_l} = 1$ atm

Keyhole formation criterion: $T_{max} = T_b$ $$\frac{\alpha P}{2(T_b - T_m)\sqrt{d_l^3 \lambda \rho C \sqrt{\frac{\partial \sigma}{\partial T} \frac{(T_b - T_m)}{\eta} V}}} < 1$$

Figure 7C:
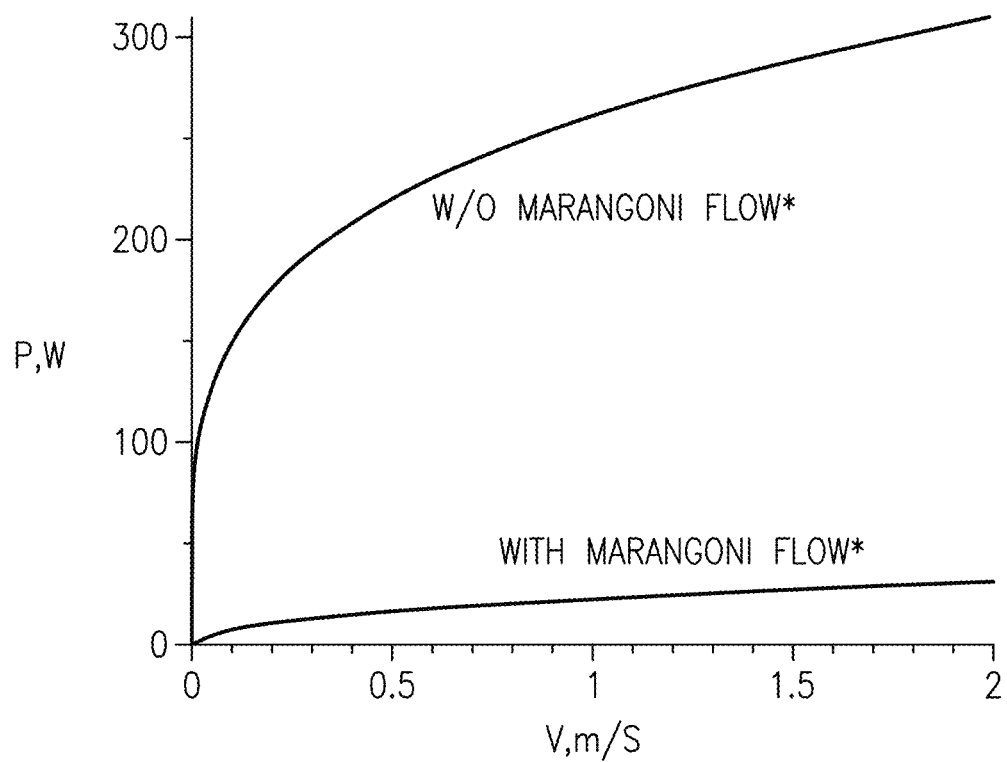

As depicted in FIG. 7C, Marangoni flow accelerates effective thermo-conductivity by approximately 75× and dramatically shifts criterion of keyhole formation.

Figure 7D:
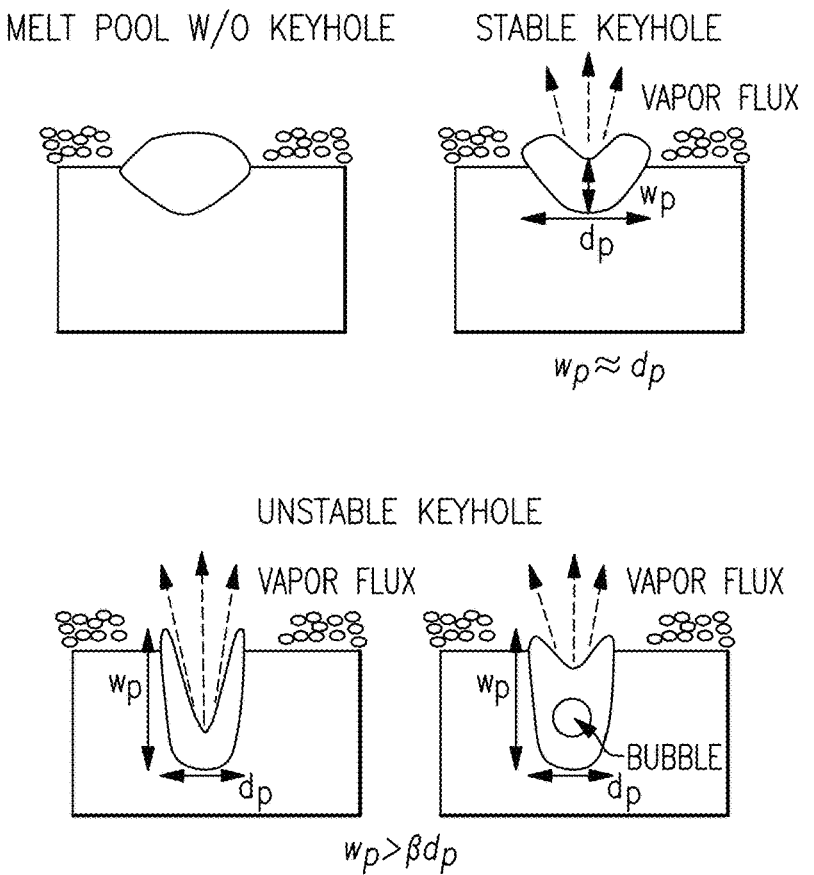

Referring also to FIG. 7D, a keyhole instability criterion is also modeled.

Keyhole instability criterion*: $\frac{\alpha \xi P}{V \Delta H} \frac{1}{\beta d_l^2} > 1$

*The numerical multiplier β=2 is determined from analysis of literature data

Figure 7E:
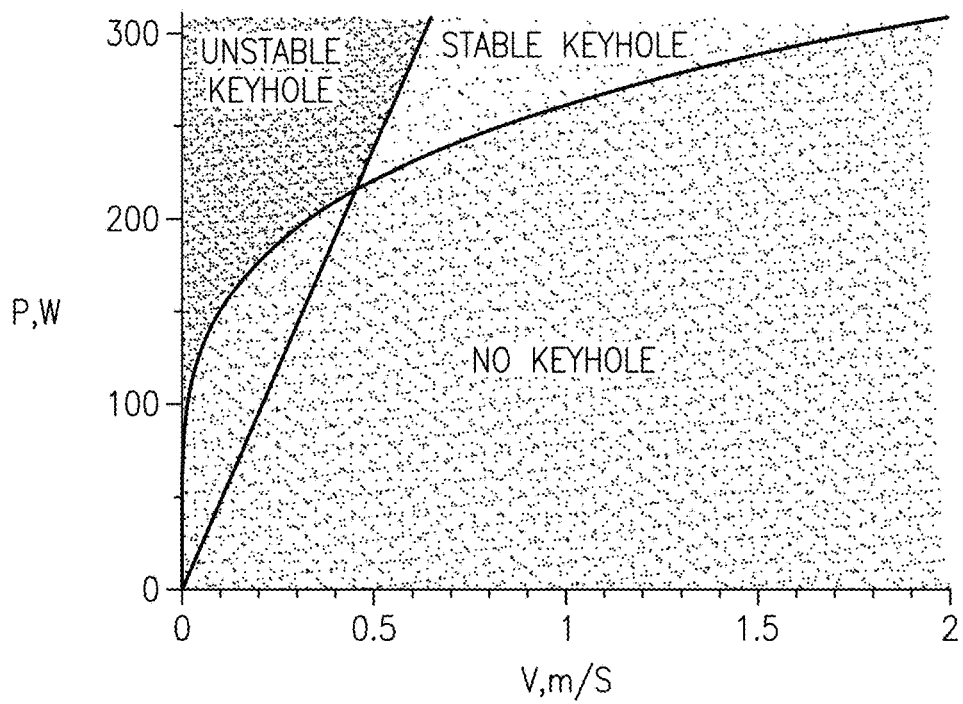
FIG. 7E illustrates an example processing map for keyholing.

FIG. 7E illustrates an example of a map of the keyhole condition region (shaded) on a plot of power versus scan rate. In this example, there is a region where no keyhole occurs, a region where a stable keyhole occurs (which may be tolerable or acceptable), and a region where an unstable keyhole occurs (defect region).

Example 5: Composite Process Map

Figure 8A:
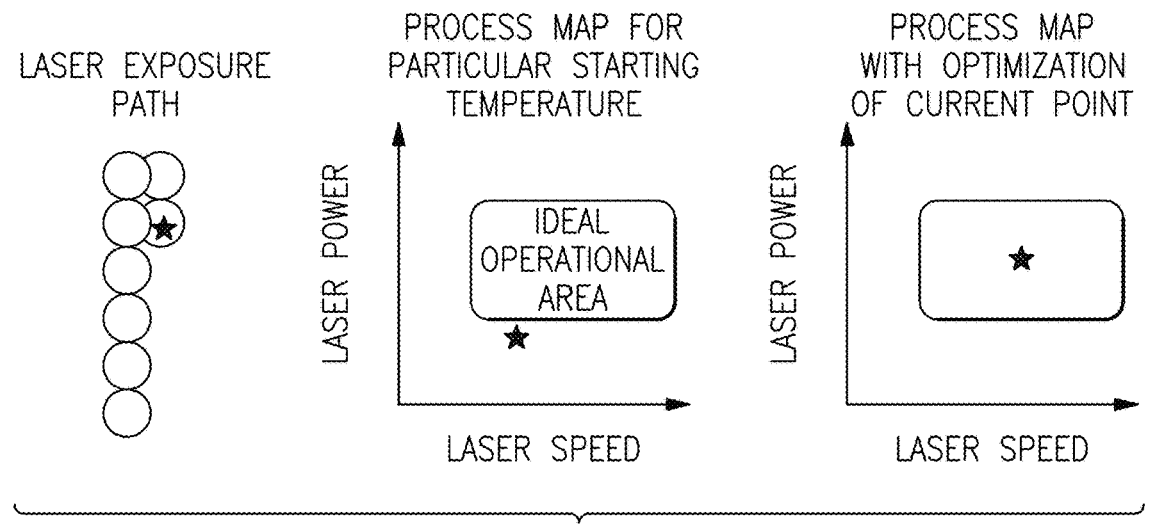
FIGS. 8A, 8B, and 8C illustrates example composite process maps.

FIG. 8A shows a schematic representation of a process map for an instant location in the work bed 22 during a process. The process map is a composite of process maps for balling, unmelt porosity, and key-holing. That is, there is an "ideal" region on the map for which combinations of power and scan rate, at that location for a given starting temperature at that location and set of process parameters, do not result in balling, unmelt porosity, or key-holing (i.e., non-defect conditions). Thus, if the power and scan rate at that location for the given starting temperature at that location lie outside of the "ideal" region, the controller 30 adjusts the power, the scan rate, or both such that the adjusted power and scan rate fall within the "ideal" region for non-defect conditions.

Figure 8B:
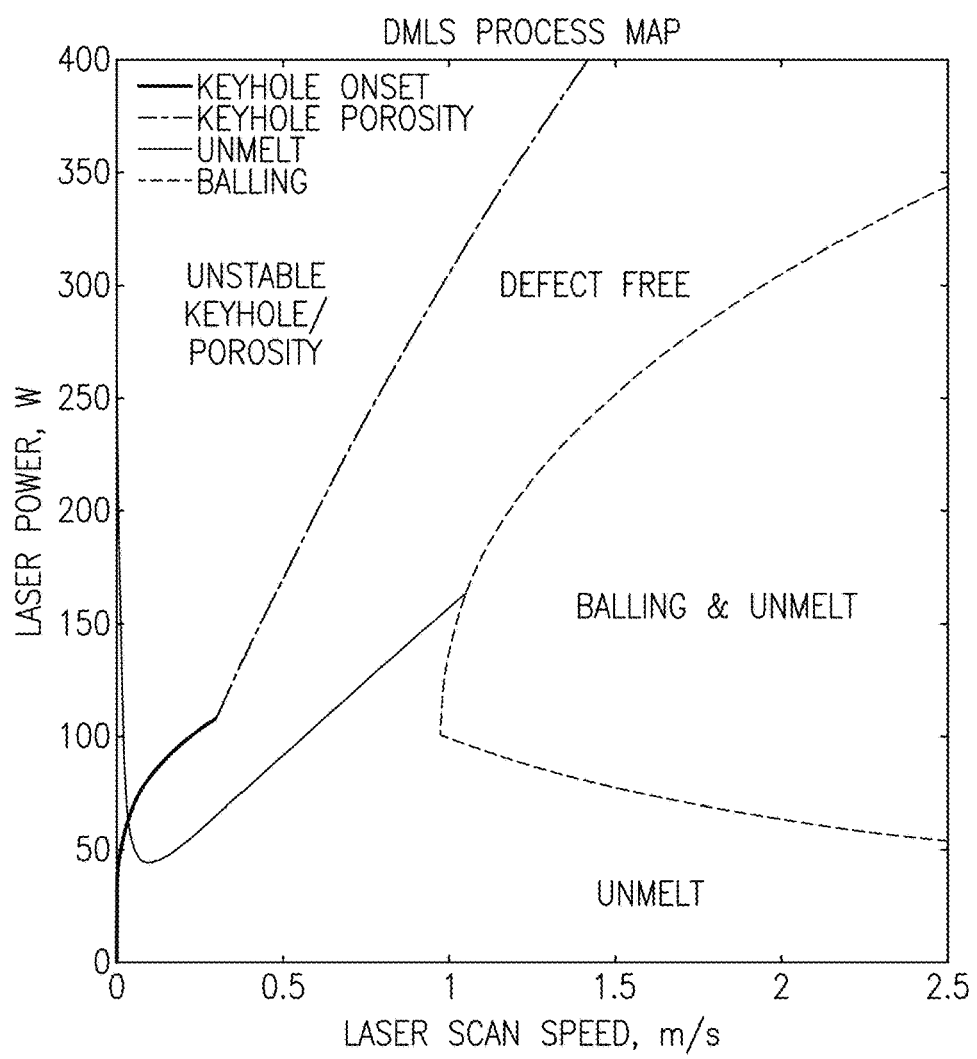
Figure 8C:
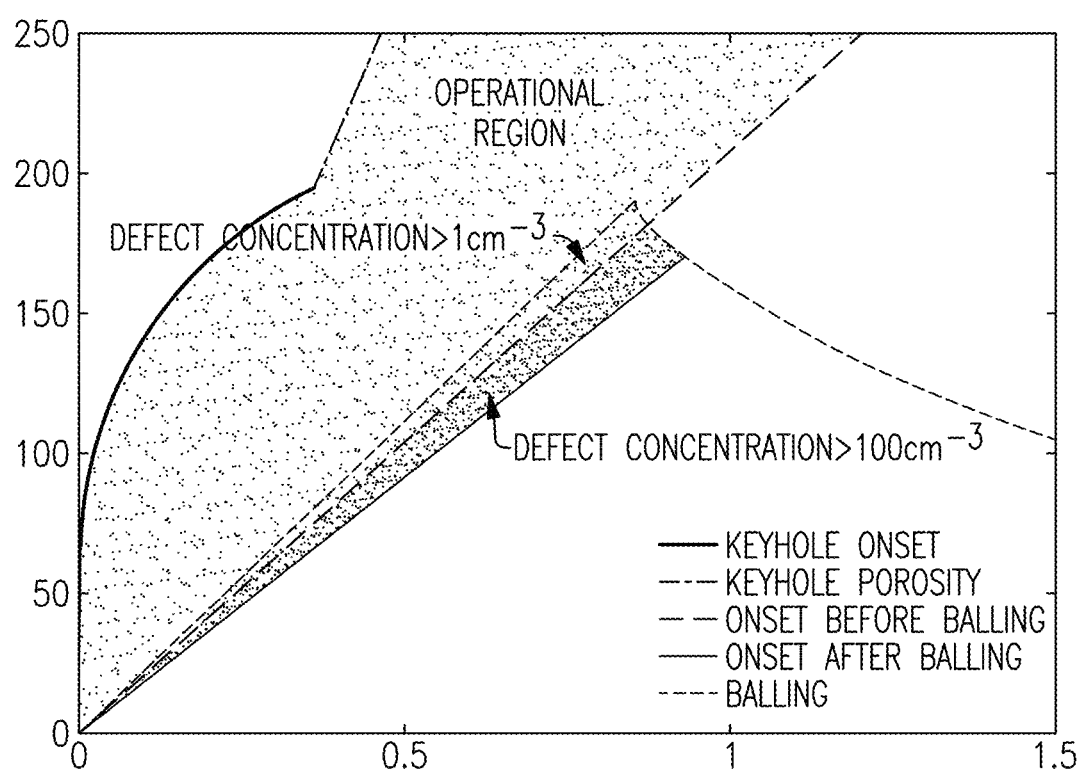

FIG. 8B illustrates a more detailed example of such a process map and listing of process parameters upon which the process map is based. As shown, there is a region where balling and unmelt porosity will occur, a region where unmelt porosity will occur, a region where unstable keyhole porosity will occur, and a defect free region where no defects occur. For the given set of process parameters, if the power and scan rate at a location for the given starting temperature at that location lie outside of the defect free region, the controller 30 adjusts the power, the scan rate, or both such that the adjusted power and scan rate fall within the defect free region (non-defect conditions). Similarly, FIG. 8C illustrates another example process map in which at least some of the defect regions are further classified according to a predicted defect concentration.

Example 6: Model of Temperature at an Energy Beam Location

The instant or starting temperature at an energy beam location in the work bed 22 is modeled and may serve as the basis of the modeling examples above. For example, the instant temperature is determined based on at least one of the temperature of the build plate surface 22a in the work bed 22, the temperature change due to previous energy beam passes in a current stripe, the temperature change due to a previous stripe in the same layer, the temperature change due to previous powder layers, or an edge factor that represents the instant location of the energy beam in the work bed 22 relative to an edge of the component being formed from the powder (collectively, "temperature factors"). As represented by the equation below, the instant temperature may be determined based on all of these temperature factors, although it will be appreciated that the temperature factors may be used individually or in combinations or two or more factors.

Figure 9:
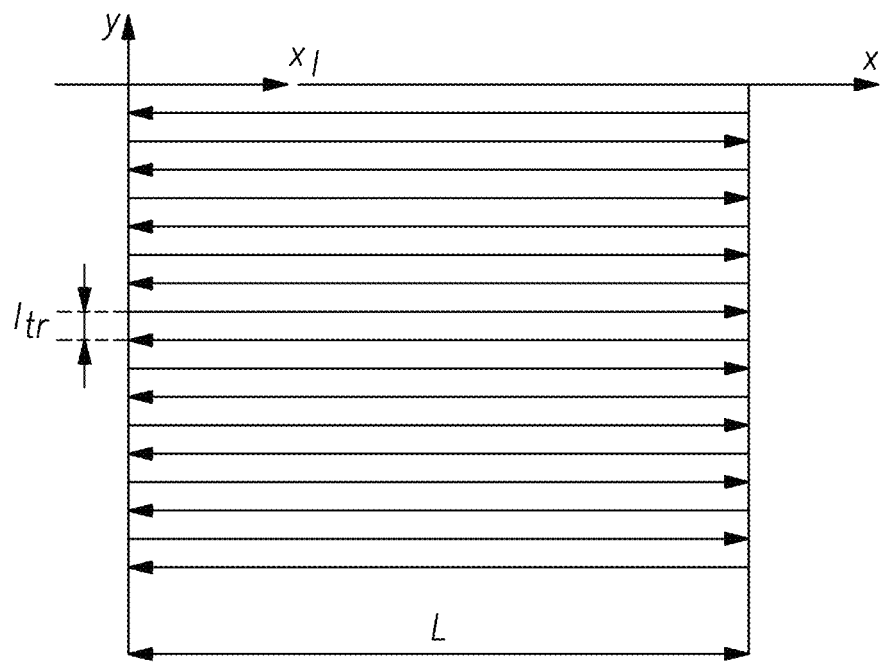
FIGS. 9 and 10 depicts models for temperature contribution from prior passes in the same stripe.
Figure 10:
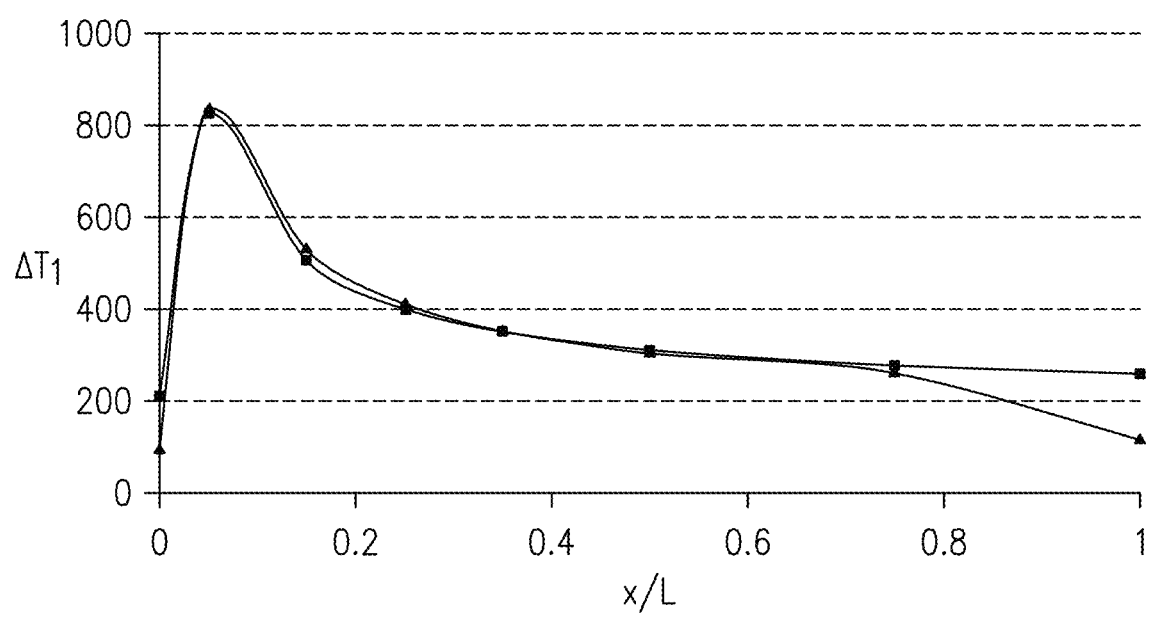

Calculation of the temperature at energy beam location, $T_0$:

$T_0 = T_{BP} + \Delta T_1 f + \Delta T_2 + \Delta T_3$ $T_{BP}$ is temperature of the build plate surface $\Delta T_1$ is temperature rise caused by previous passes in current stripe $\Delta T_2$ is temperature rise caused by previous stripes of current layer $\Delta T_3$ is temperature rise caused by previous layers f is the factor that takes into account the edge effect With reference to FIG. 9, the stripe is the path in the y-direction. The energy beam passes back and forth in the x-direction along the stripe. At each pass, the energy beam is adjacent the prior pass, which adds heat to locations along the current pass. As shown in FIG. 10, this causes a large temperature increase immediately after the energy beam turns into a new pass because the adjacent prior pass has not had time to cool. As the energy beam continues in the x-direction though, the immediately adjacent pass has had more time to cool and thus adds less heat.

$\Delta T_1$ (previous passes in current stripe):

$$\Delta T_1(x) = T_{1x}(x) - T_1 - \frac{\alpha P}{2\pi\kappa\sqrt{L^2 + l_{tr}^2}} \log\left(1 - \exp\left(-\frac{V\left(\sqrt{L^2 + l_{tr}^2} - L\right)}{2D_T}\right)\right)$$

$$f(y) = 1 + \exp\left(-\frac{Vl_{tr}(1 + \cos\beta)y}{D_T L}\right)$$

Imaginary beam with effective velocity $v_{eff} = v_l \frac{l_{tr}}{L}$

Green function of point source $$\Delta T(r) = \frac{\alpha P}{2\pi\kappa r}\exp\left(-\frac{v_{eff}(x+r)}{2D_T}\right) \begin{matrix} r = 2\ y \\ x = 2\ y \cos\beta \end{matrix}$$

Figure 12:
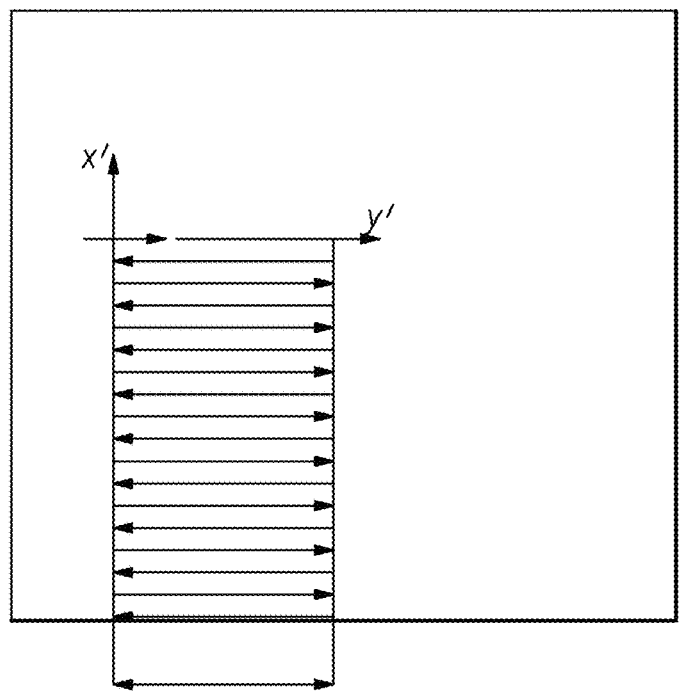
FIG. 12 depicts a model for temperature contribution from the prior stripe.

Referring to FIG. 12, $\Delta T_2$ (previous stripes):

$$\Delta T_2(x, y) = \frac{\alpha P}{4\pi L\kappa} \cdot I(x, y)$$

$$L_r = \frac{L}{\sqrt{4D_T L/V}},\ V_r = \frac{l_{st}}{\sqrt{4D_T L/V}},\ (x, y) = \left(\frac{x'}{L}, \frac{y'}{L}\right)$$

$$I = \exp(-2V_rL_rx)\left\{ 2K_0(2\cdot|V_rL_rx|) \left[ \begin{array}{l} \left(erf\left(\frac{(V_rL_r)^{0.5}(0.5+y)}{|x|^{0.5}}\right) + erf\left(\frac{(V_rL_r)^{0.5}(0.5-y)}{|x|^{0.5}}\right)\right) + \frac{(V_rL_r)^{0.5}}{|\pi x|^{0.5}} \cdot \\ \cdot\left((0.5+y)\exp\left(-\frac{V_rL_r(0.5+y)^2}{|x|}\right) + (0.5-y)\exp\left(-\frac{V_rL_r(0.5-y)^2}{|x|}\right)\right) \end{array} \right] - \right.$$
$$\left. - \frac{(V_rL_r)^{0.5}}{|\pi x|^{0.5}} \cdot (2K_1(2\cdot|V_rL_rx|)) \cdot \left((0.5+y)\exp\left(-\frac{V_rL_r(0.5+y)^2}{|x|}\right) + (0.5-y)\exp\left(-\frac{V_rL_r(0.5-y)^2}{|x|}\right)\right) \right\}$$

$K_0(z)$ and $K_1(z)$ is Bessel functions

Figure 13:
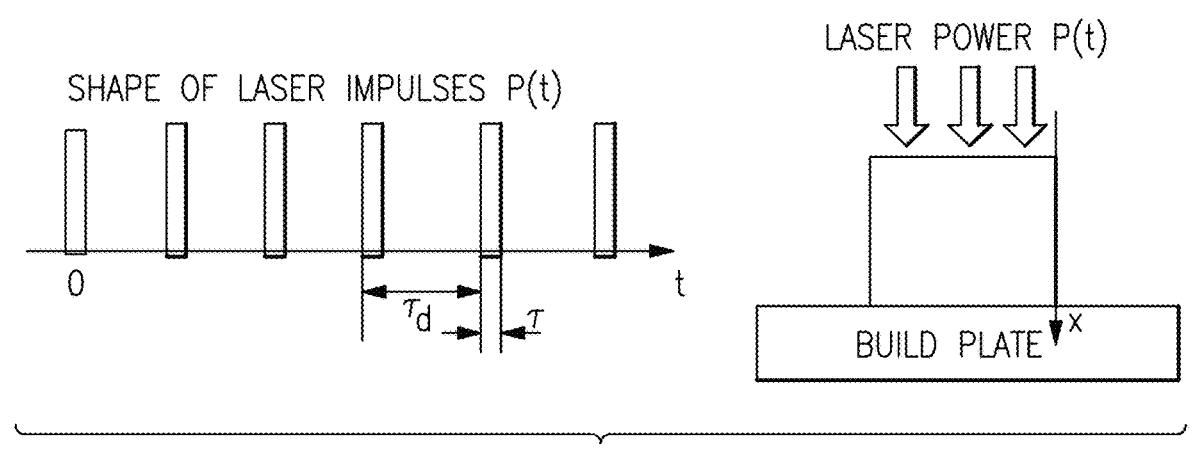
FIG. 13 depicts a model for temperature contribution from the prior layer.

Referring to FIG. 13, $\Delta T_3$ (previous layers):

$$\Delta T_3 = \frac{2P}{A\ \kappa h} \sum_{k=0}^{\infty} \left[(-1)^k \cdot \frac{\sin(\sqrt{\lambda_k}\ h)}{\lambda_k}\right](\exp(-D_T\lambda_k\tau_d) - \exp(-D_T\lambda_k\tau_p)) \cdot \left(\frac{1 - \exp(-D_T\lambda_k t)}{1 - \exp(-D_T\lambda_k\tau_p)}\right)$$

$$\lambda_k = \left(\frac{\pi(2k+1)}{2h}\right)^2$$

$$\tau = \frac{A}{l_{st}V}$$

$$\tau_p = \tau + \tau_d$$

-continued $$T_{1x}(x) = \frac{\alpha P}{2\pi\kappa\sqrt{4x^2 + l_{tr}^2}}\exp\left(-\frac{V\left(\sqrt{4x^2 + l_{tr}^2} - 2x\right)}{2D_T}\right)$$

$$T_1 = \frac{\alpha P}{2\pi\kappa}\frac{1}{\sqrt{L^2 + l_{tr}^2}}\exp\left(-\frac{V\left(\sqrt{L^2 + l_{tr}^2} - L\right)}{2D_T}\right)$$

Figure 11:
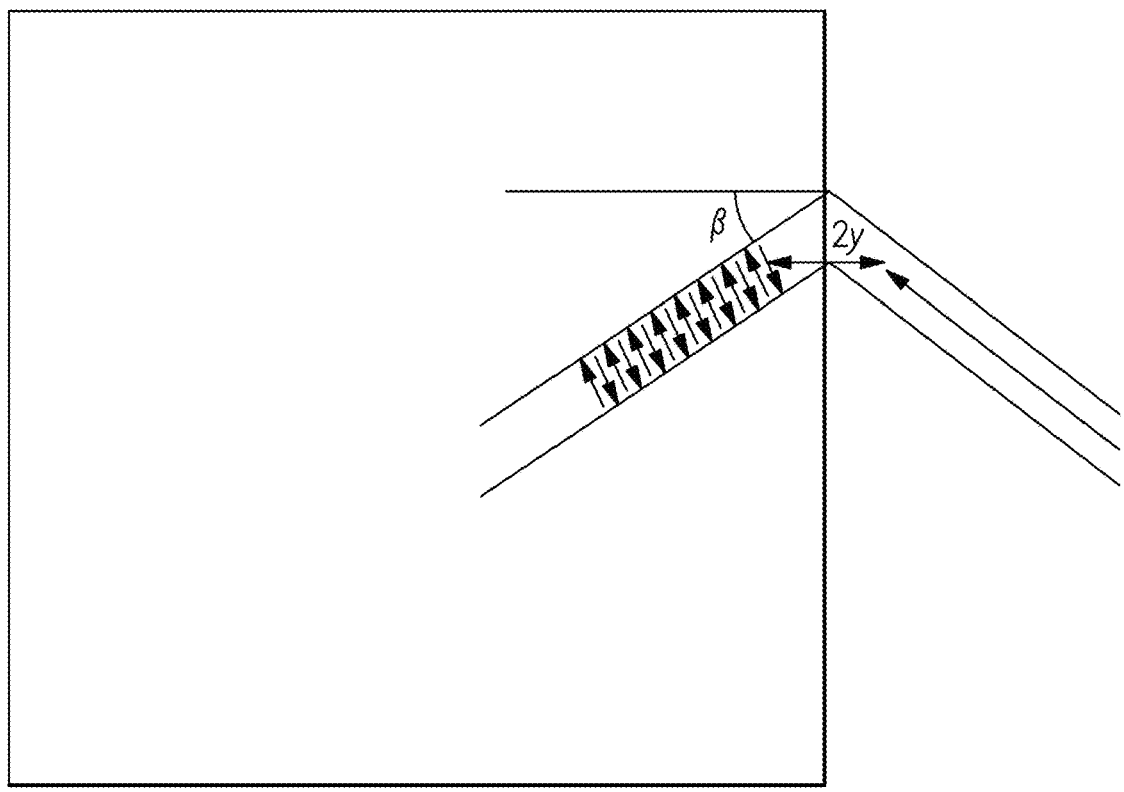
FIG. 11 depicts a model for temperature contribution from an edge effect.

P is laser power
$\alpha$ is laser absorptivity
V is scanning velocity
L is stripe width
$l_{st}$ is hatching distance
$\kappa$ is thermal conductivity
$D_T$ is thermal diffusivity Referring to FIG. 11, the effect of the prior pass may also be influenced by proximity of the instant energy beam location to an edge or perimeter of the component being built. At an edge, there is lower heat transport and heat thus accumulates to further increase temperature. This effect is modeled and represented in the determination of the temperature at the instant energy beam location as an edge factor, f. The edge factor is a function of the distance from the instant location of the energy beam to the edge.

Figure 14:
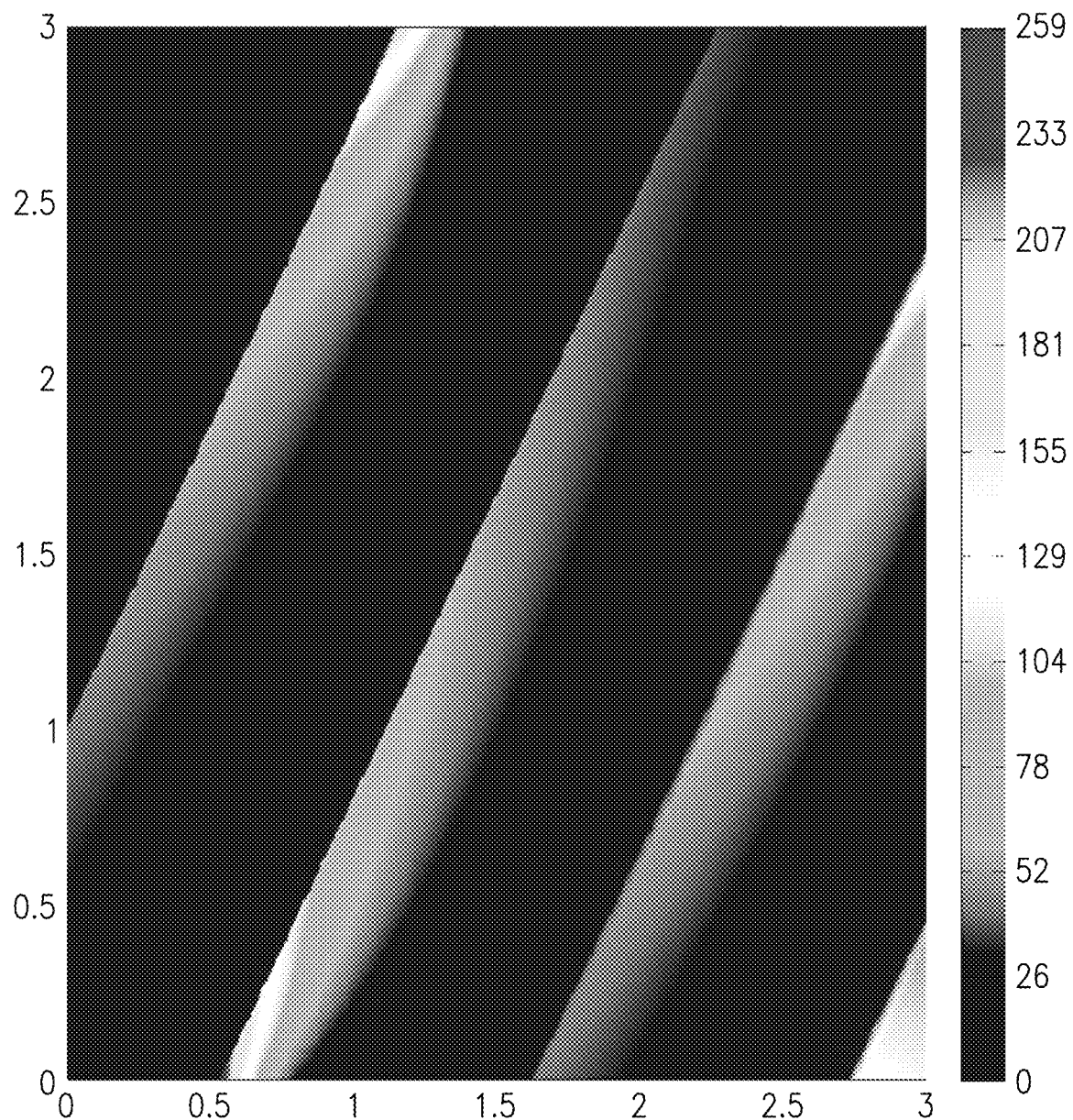
FIG. 14 illustrates a temperature distribution at a height above the build plate.

P is laser power
A is part surface area
h is the distance of part top surface from the build plate
$\tau$ is the time of one layer hatching
$\tau_d$ is delay time
n is the number of formed layers
$\Delta$h is layer thickness Example 7: Model of Distribution of Temperature and Defects As shown in the example of FIG. 14, a distribution of temperature can be mapped on the energy beam path. In this example, the path stripes are angled to the right in the figure. Each point in the map represents the temperature, i.e., the temperature $T_0$ in the point (x,y) at a time moment, when the energy beam passes that point.

Figure 15:
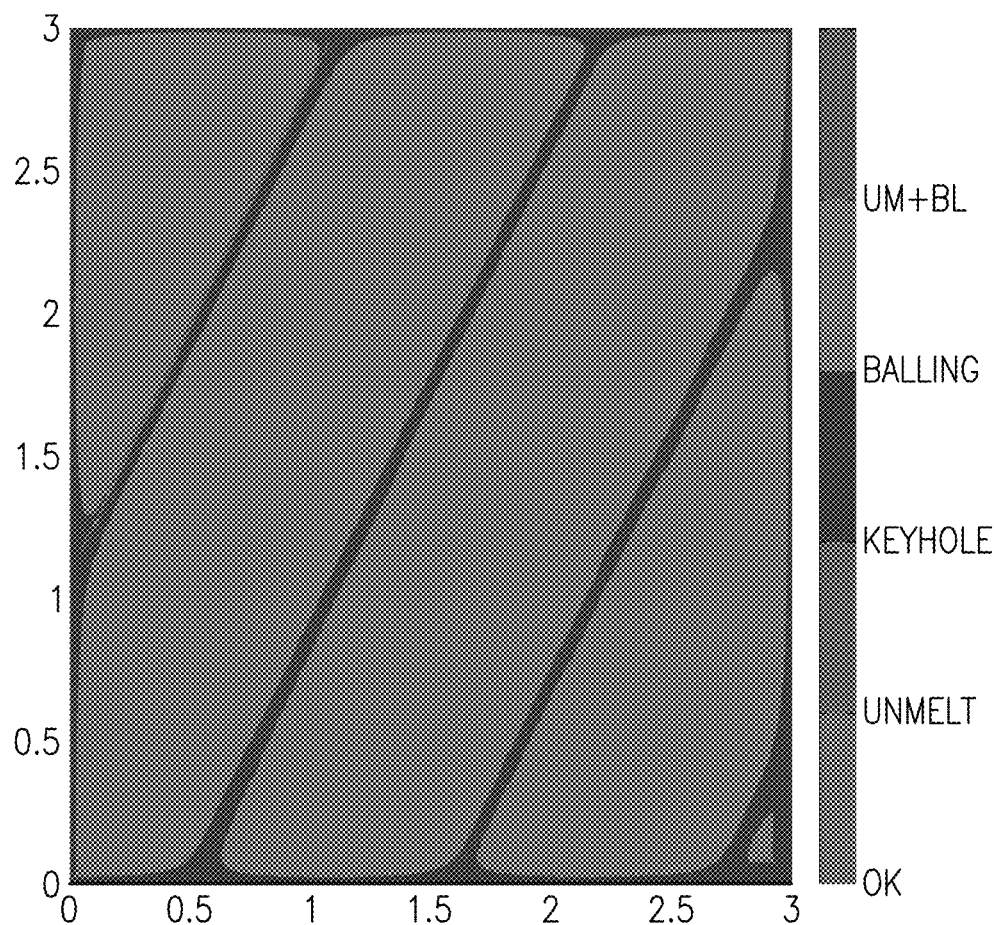
FIG. 15 illustrates a defect distribution at a height above the build plate.
Figure 16:
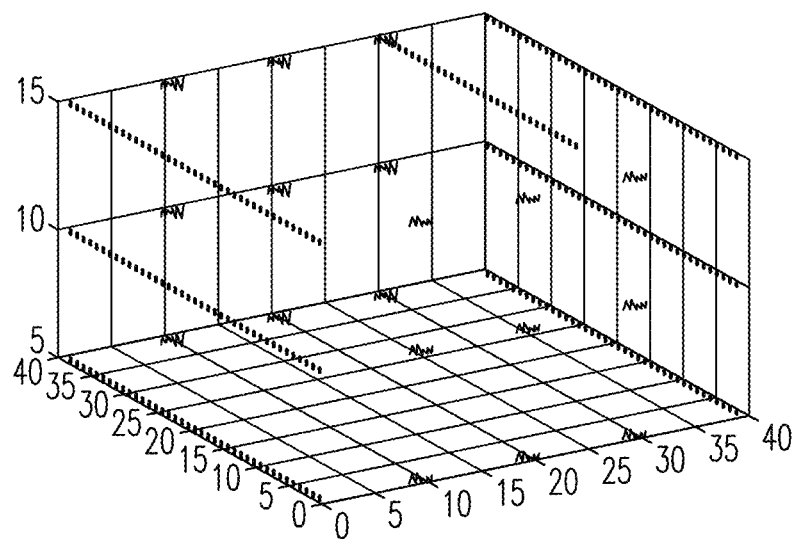
FIG. 16 illustrates a defect distribution in a three-dimensional space.

As shown in FIG. 15, a distribution of defects can also be mapped. In this example, the distribution of defects is mapped in a layer located at height h from the build plate 22a. As shown in FIG. 16, rather than a singular height, a distribution of defects can also be mapped in a three-dimensional volumetric space of the component. In this example, the distribution reveals a non-optimal build in which there are repeating point defects and repeating linear defects.

Example 8: Model of Downskin

Figure 17:
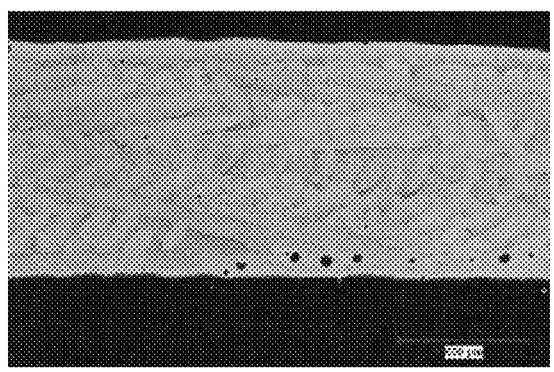
FIG. 17 illustrates a micrograph of an edge section of a component.

FIG. 17 shows a micrograph of a downskin perimeter region of a component with porosity defects. The occurrence of such defects is modeled and provides opportunity to employ a control scheme to reduce occurrence of such defects. A "downskin" is a section of a component that overhangs the powder in the work bed 22 (versus a section that is on top of the component).

Figure 18:
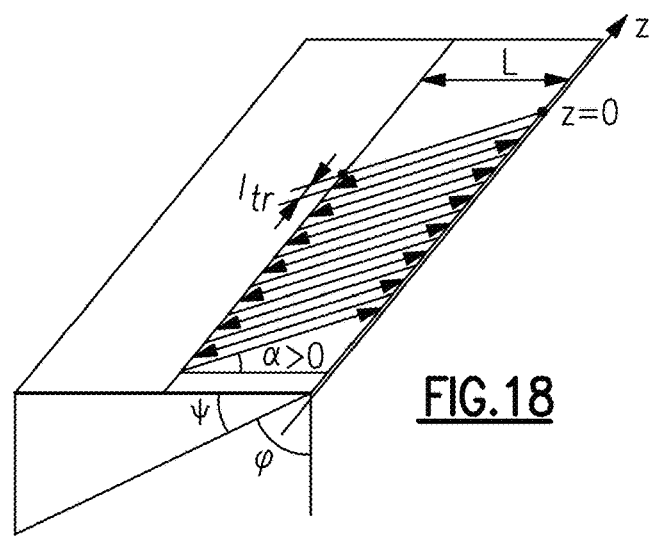
FIG. 18 depicts a model of an edge section of a component.
Figure 19:
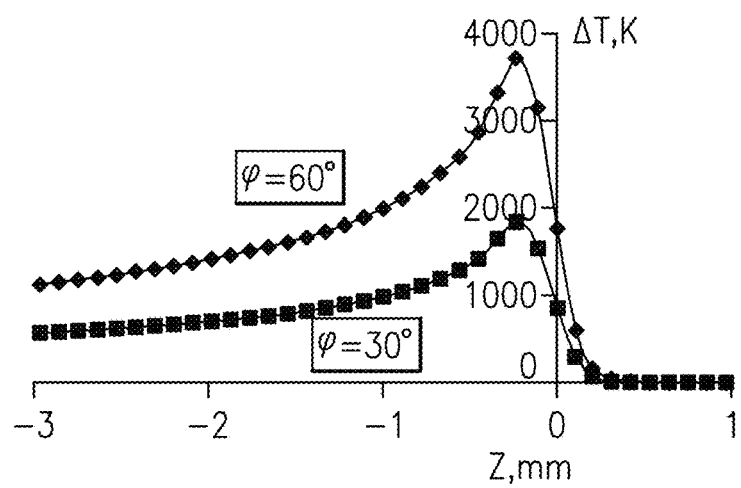
FIG. 19 illustrates a temperature profile along the edge section of FIG. 18.

FIG. 18 illustrates a representative model of a downskin section and the path of the energy beam in a stripe at the edge. The downskin accumulates heat because of low thermal conductivity of the powder. The heat, in turn, causes defects such as porosity and excessive surface roughness. As shown in FIG. 19, the angle ($\varphi$) is the compliment to the angle ($\psi$) of the downskin section. The angle ($\varphi$) has a strong influence on the accumulation of heat. Thus, for higher angles ($\varphi$), which correspond to lower angles ($\psi$), there is greater heat accumulation and correspondingly higher temperature increase. This indicates that for defects that occur due to excessive temperature in the downskin region, decreasing the angle ($\varphi$) will reduce temperature in the downskin region.

Temperature profile in downskin region:

$$T(z) =$$

$$T_0 + T_{ref} \sum_{n=1}^{\infty} \int_0^1 \frac{d\xi}{(2n-\xi)^{3/2}} \exp\left[-\frac{\xi^2 + \left(\frac{(2n-1)l_{tr}+z}{L} + \xi \tan\alpha\right)^2}{4B(2n-\xi)}\right] +$$

$$T_{ref} \sum_{n=1}^{\infty} \int_0^1 \frac{d\xi}{(2n+\xi)^{3/2}} \exp\left[-\frac{\xi^2 + \left(\frac{2nl_{tr}+z}{L} + \xi \tan\alpha\right)^2}{4B(2n+\xi)}\right]$$

$$T_{ref}(P, v_l, \varphi, \alpha) = \frac{aP}{4\varphi\kappa} \sqrt{\frac{v_l \cos\alpha}{\pi L D_T}}$$

$$B = \frac{D_T}{L v_l \cos\alpha}$$

Equation for downskin control:

$$f(V) = \max_m \left( \sum_{n=1}^{N} \sqrt{\pi} \exp\left(\frac{n}{B}\right) \left[ \frac{u_n(m)}{2a_1} + \frac{v_n(m)}{2a_2} \right] \right)$$

$$P(V, \varphi) = (T_{melt} - T_0) \frac{4(\pi/2 - \varphi)\kappa}{\alpha_{abs} f(V)} \sqrt{\frac{\pi L D_T}{V}}$$

wherein, $$u_n(m) = \left\{ -\frac{1}{\sqrt{\pi}} \frac{e^{-\frac{a_1^2}{2n-1} - b^2(2n-1)}}{\frac{a_1}{\sqrt{2n-1}}\left(1 + \frac{(2n-1)b}{a_1}\right)} + \right.$$

-continued $$\left. e^{-2a_1 b}\left[1 + erf\left(\frac{a_{1'}}{\sqrt{2n-1}} - b\sqrt{2n-1}\right)\right] \right\} -$$

$$\left\{ -\frac{1}{\sqrt{\pi}} \frac{e^{-\frac{a_1^2}{2n} - 2nb^2}}{\frac{a_1}{\sqrt{2n}}\left(1 + \frac{2nb}{a_1}\right)} + e^{-2a_1 b}\left[1 + erf\left(\frac{a_1}{\sqrt{2n}} - b\sqrt{2n}\right)\right] \right\}$$

$$v_n(m) = \left\{ -\frac{1}{\sqrt{\pi}} \frac{e^{-\frac{a_2^2}{2n} - 2nb^2}}{\frac{a_2}{\sqrt{2n}}\left(1 + \frac{2nb}{a_2}\right)} + e^{-2a_2 b}\left[1 + erf\left(\frac{a_2}{\sqrt{2n}} - b\sqrt{2n}\right)\right] \right\} -$$

$$\left\{ -\frac{1}{\sqrt{\pi}} \frac{e^{-\frac{a_2^2}{2n+1} - 2(n+1)b^2}}{\frac{a_2}{\sqrt{2n+1}}\left(1 + \frac{(2n+1)b}{a_2}\right)} + \right.$$

$$\left. e^{-2a_2 b}\left[1 + erf\left(\frac{a_2}{\sqrt{2n+1}} - b\sqrt{2n+1}\right)\right] \right\}$$

$$B = \frac{D_T}{LV}$$

$$l_{str} = \frac{l_{tr}}{L}$$

$$a_1 = \sqrt{\frac{4n^2 + l_{str}^2(2n+m-1)^2}{4B}}$$

$$a_2 \sqrt{\frac{4n^2 + l_{str}^2(2n+m)^2}{4B}}$$

$$b = \sqrt{\frac{1}{4B}}$$

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:
1. A powder processing machine comprising:
a work bed;
a powder deposition device operable to deposit powder in the work bed;
at least one energy beam device operable to emit an energy beam with a variable beam power and direct the energy beam onto the work bed with a variable beam scan rate to melt and fuse regions of the powder; and
a controller operable to dynamically control at least one of the beam power or the beam scan rate to change how the powder melts and fuses, the controller configured to determine whether an instant set of process parameters falls within a defect condition or a non-defect condition and adjust at least one of the beam power or the beam scan rate responsive to the defect condition such that the instant set of process parameters falls within the non-defect condition, the instant set of process parameters including an instant temperature at an instant location of the energy beam in the work bed, and the instant temperature is based, at least in part, on an edge factor that represents an instant location of the energy beam in the work bed relative to an edge of a component being formed from the powder.

2. The powder processing machine as recited in claim 1, wherein the instant temperature is determined based, at least in part, on a temperature of a build plate surface in the work bed.

3. The powder processing machine as recited in claim 1, wherein the instant temperature is based, at least in part, on a temperature change due to previous energy beam passes in a current stripe.

4. The powder processing machine as recited in claim 1, wherein the instant temperature is based, at least in part, on a temperature change due to a previous stripe.

5. The powder processing machine as recited in claim 1, wherein the instant temperature is based, at least in part, on a temperature change due to previous powder layers.

6. The powder processing machine as recited in claim 1, wherein the instant temperature is $T_0 = T_{BP} + \Delta T_1 f + \Delta T_2 + \Delta T_3$, where $T_0$ is the instant temperature, $T_{BP}$ is a temperature of a build plate surface in the work bed, $\Delta T_1$ is a temperature change due to previous energy beam passes in a current stripe, $\Delta T_2$ is a temperature change due to a previous stripe, $\Delta T_3$ is a temperature change due to previous powder layers, and f is an edge factor that represents an instant location of the energy beam in the work bed relative to an edge of a component being formed from the powder.

7. The powder processing machine as recited in claim 1, wherein the defect condition and non-defect condition are based, at least in part, on at least one of an instant surface stress of a melt pool of the powder at an instant location of the energy beam in the work bed, an energy density of the energy beam and an instant cross-sectional area of a melt pool of the powder at an instant location of the energy beam in the work bed, or an instant diameter of a melt pool of the powder at an instant location of the energy beam in the work bed.

8. A powder processing machine comprising:
a work bed;
a powder deposition device operable to deposit powder in the work bed;
at least one energy beam device operable to emit an energy beam with a variable beam power and direct the energy beam onto the work bed with a variable beam scan rate to melt and fuse regions of the powder; and
a non-transitory computer-readable media comprising instructions, operable when executed, to:
dynamically control at least one of the variable beam power or the variable beam scan rate of the energy beam in the powder processing machine to change how a powder melts and fuses in the work bed of the powder processing machine, by
determining whether an instant set of process parameters falls within a defect condition or a non-defect condition, and
adjusting at least one of the variable beam power or the variable beam scan rate responsive to the defect condition such that the instant set of process parameters falls within the non-defect condition, the instant set of process parameters including an instant temperature at an instant location of the energy beam in the work bed, and the instant temperature is based, at least in part, on an edge factor that represents an instant location of the energy beam in the work bed relative to an edge of a component being formed from the powder.

9. The powder processing machine as recited in claim 8, wherein the instant temperature is determined based on at least one of a temperature of a build plate surface in the work bed, a temperature change due to previous energy beam passes in a current stripe, a temperature change due to a previous stripe in the same layer, or a temperature change due to previous powder layers.

10. The powder processing machine as recited in claim 8, wherein the instant temperature is $T_0 = T_{BP} + \Delta T_1 f + \Delta T_2 + \Delta T_3$, where $T_0$ is the instant temperature, T BP is a temperature of a build plate surface in the work bed, $\Delta T_1$ is a temperature change due to previous energy beam passes in a current stripe, $\Delta T_2$ is a temperature change due to a previous stripe in the same layer, $\Delta T_3$ is a temperature change due to previous powder layers, and f is an edge factor that represents an instant location of the energy beam in the work bed relative to an edge of the component being formed from the powder.

11. The powder processing machine as recited in claim 8, wherein the defect condition and non-defect condition are based, at least one part, on at least one of an instant surface stress of a melt pool of the powder at an instant location of the energy beam in a work bed, an energy density of the energy beam and an instant cross-sectional area of a melt pool of the powder at an instant location of the energy beam in the work bed, or an instant diameter of a melt pool of the powder at an instant location of the energy beam in the work bed.

12. The powder processing machine as recited in claim 8, including adjusting the beam power by adjusting a time that the energy beam is on (non-zero power) and off (zero power).

13. A method for use in a powder processing machine, the method comprising:
dynamically controlling at least one of a beam power or a beam scan rate of an energy beam in a powder processing machine to change how a powder melts and fuses in a work bed of the powder processing machine, by
determining whether an instant set of process parameters falls within a defect condition or a non-defect condition, and
adjusting at least one of the beam power or the beam scan rate responsive to the defect condition such that the instant set of process parameters falls within the non-defect condition, the instant set of process parameters including an instant temperature at an instant location of the energy beam in the work bed, and the instant temperature is based, at least in part, on an edge factor that represents an instant location of the energy beam in the work bed relative to an edge of a component being formed from the powder.

14. The method as recited in claim 13, wherein the instant temperature is determined base, at least in part, on at least one of a temperature of a build plate surface in the work bed, a temperature change due to previous energy beam passes in a current stripe, a temperature change due to a previous stripe in the same layer, or a temperature change due to previous powder layers.

15. The method as recited in claim 13, wherein the instant temperature is $T_0 = T_{BP} + \Delta T_1 f + \Delta T_2 + \Delta T_3$, where $T_0$ is the instant temperature, $T_{BP}$ is a temperature of a build plate surface in the work bed, $\Delta T_1$ is a temperature change due to previous energy beam passes in a current stripe, $\Delta T_2$ is a temperature change due to a previous stripe in the same layer, $\Delta T_3$ is a temperature change due to previous powder layers, and f is an edge factor that represents an instant location of the energy beam in the work bed relative to an edge of the component being formed from the powder.

16. The method as recited in claim 13, wherein the defect condition and non-defect condition are based on at least one of an instant surface stress of a melt pool of the powder at an instant location of the energy beam in a work bed, an energy density of the energy beam and an instant cross-sectional area of a melt pool of the powder at an instant location of the energy beam in the work bed, or an instant diameter of a melt pool of the powder at an instant location of the energy beam in the work bed.

17. The method as recited in claim 13, including adjusting the beam power by adjusting a time that the energy beam is on (non-zero power) and off (zero power).

18. A method for use with a powder processing machine that is operable in an additive manufacturing process to melt and fuse a powder in a work bed by at least one energy beam emitted from at least one energy beam device along a path to form a component, the method comprising:

simulating temperature location-by-location along a perimeter of a component in an additive manufacturing process based on an instant set of process parameters, a power of the energy beam, a speed of the energy beam, and the path of the energy beam, wherein the instant set of process parameters include an instant temperature at an instant location of the energy beam in the work bed, and the instant temperature is based, at least in part, on an edge factor that represents an instant location of the energy beam in the work bed relative to an edge of a component being formed from the powder;

comparing the simulated temperature to a critical temperature criteria for formation of a defect to determine location-by-location along the path whether the simulated temperature will result in formation of the defect;

if the simulated temperature is determined to result in formation of the defect, adjusting at least one of the power of the energy beam, the speed of the energy beam, or the path of the energy beam and repeating the simulating and comparing until the simulated temperature will not result in formation of the defect; and using the adjusted power of the energy beam, speed of the energy beam, or path of the energy beam in the additive manufacturing process to actually make the component.

19. The method as recited in claim 18, wherein the simulating of the temperature includes geometric parameters representing the geometry of the perimeter of the component.

20. The method as recited in claim 18, wherein the set of process parameters includes a stripe width of the path and an angle of the perimeter of the component.

* * * * *